United States Patent
Dror et al.

(10) Patent No.: US 10,382,087 B1
(45) Date of Patent: Aug. 13, 2019

(54) ADAPTATION OF ZERO INTERMEDIATE FREQUENCY (ZIF) TRANSMITTER TO CORRECT LOCAL OSCILLATOR (LO) LEAKAGE

(71) Applicant: TEXAS INSTRUMENTS INCORPORATED, Dallas, TX (US)

(72) Inventors: Joel Dror, Pardes-Hanna-Karkur (IL); Eran Nussbaum, Herzliya (IL); Shai Erez, Holon (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/221,391

(22) Filed: Dec. 14, 2018

(51) Int. Cl.
  H04B 1/04 (2006.01)
  H04B 1/48 (2006.01)
  H04B 1/525 (2015.01)

(52) U.S. Cl.
  CPC .......... H04B 1/525 (2013.01); H04B 1/0475 (2013.01); H04B 1/48 (2013.01)

(58) Field of Classification Search
  CPC ......... H04B 1/525; H04B 1/0475; H04B 1/48
  See application file for complete search history.

(56) References Cited

U.S. PATENT DOCUMENTS

| | | | | |
|---|---|---|---|---|
| 2002/0163391 | A1* | 11/2002 | Peterzell | H03D 1/2254 331/25 |
| 2003/0040292 | A1* | 2/2003 | Peterzell | H03D 3/008 455/147 |
| 2004/0217797 | A1* | 11/2004 | Cao | H04L 25/0296 327/307 |
| 2006/0222117 | A1* | 10/2006 | Rahman | H03D 3/008 375/345 |
| 2008/0165899 | A1* | 7/2008 | Rahman | H04B 1/30 375/319 |
| 2015/0280946 | A1* | 10/2015 | Sabouri | H04L 25/063 375/319 |
| 2017/0201368 | A1* | 7/2017 | Hou | H04L 5/0048 |
| 2019/0020310 | A1* | 1/2019 | Modi | H03D 3/009 |

* cited by examiner

*Primary Examiner* — Lewis G West
(74) *Attorney, Agent, or Firm* — Ebby Abraham; Charles A. Brill; Frank D. Cimino

(57) ABSTRACT

An integrated circuit. The integrated circuit comprises an analog transmit chain, an analog receive chain, a processor coupled to the analog transmit and receive chains, and a non-transitory storage coupled to the processor and storing executable code. When executed by the processor, the executable code causes the processor to cause a portion of a radio frequency (RF) signal to be transmitted by the analog transmit chain, to determine a first direct current (DC) voltage of a baseband signal provided by the analog receive chain, to cause a DC voltage offset to be input into the analog transmit chain, to determine a second DC voltage of another baseband signal provided by the analog receive chain, to determine a DC voltage offset compensation based on the first and second DC voltages and the DC voltage offset, and to cause the DC voltage offset compensation to be used to transmit signals.

20 Claims, 3 Drawing Sheets

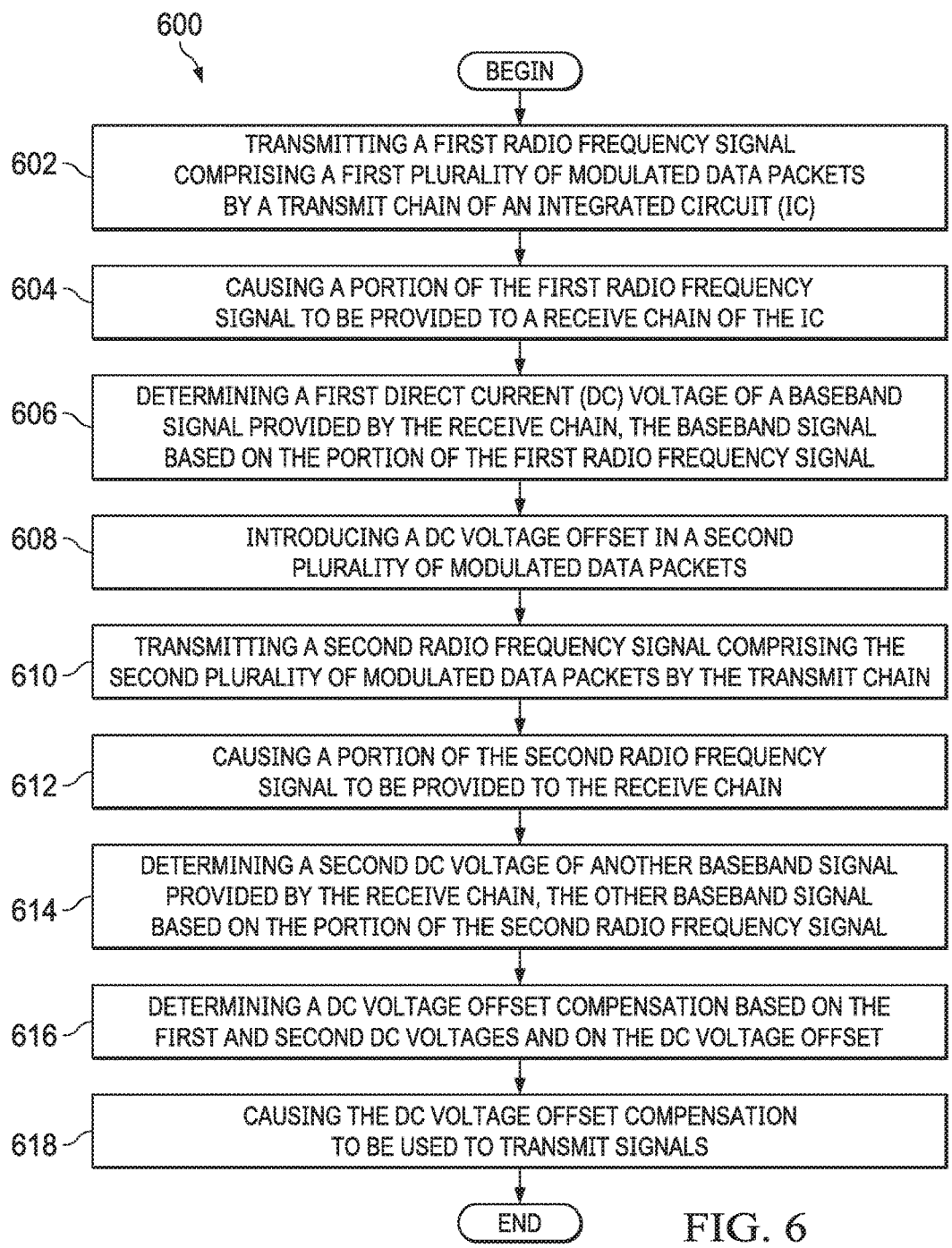

US 10,382,087 B1

ADAPTATION OF ZERO INTERMEDIATE FREQUENCY (ZIF) TRANSMITTER TO CORRECT LOCAL OSCILLATOR (LO) LEAKAGE

BACKGROUND

Radio transmitters receive a baseband signal, shift the baseband signal up to a higher frequency, and transmit the resulting radio frequency signal via an antenna. Radio receivers shift a received radio frequency signal down to a baseband signal and process the baseband signal to access the information content of the signal. Sometimes radio transmitters and radio receivers are combined in a device referred to as a radio transceiver. In transmitting radio frequency signals it is desirable to restrict transmissions within an allowed frequency spectrum to avoid interfering with other radio communications. Local radio authorities, for example the Federal Communications Commission (FCC) in the United States, establish regulations pertaining to radio transmissions.

SUMMARY

In accordance with at least one example of the disclosure, an integrated circuit comprises an analog transmit chain, an analog receive chain, a processor coupled to the analog transmit and receive chains, and a non-transitory storage coupled to the processor and storing executable code. When executed by the processor, the executable code causes the processor to cause a portion of a radio frequency (RF) signal to be transmitted by the analog transmit chain, to determine a first direct current (DC) voltage of a baseband signal provided by the analog receive chain, the baseband signal based on a portion of the RF signal received by the analog receive chain, to cause a DC voltage offset to be input into the analog transmit chain, after the introduction of the DC voltage offset into the analog transmit chain, to determine a second DC voltage of another baseband signal provided by the analog receive chain based on the portion of the RF signal, to determine a DC voltage offset compensation based on the first and second DC voltages and the DC voltage offset, and to cause the DC voltage offset compensation to be used to transmit signals.

In accordance with at least one example of the disclosure a method of radio transmitting comprises transmitting a first radio frequency signal comprising a first plurality of modulated data packets by a transmit chain of an integrated circuit (IC), causing a portion of the first radio frequency signal to be provided to a receive chain of the IC, determining a first direct current (DC) voltage of a baseband signal provided by the receive chain, the baseband signal based on the portion of the first radio frequency signal, introducing a DC voltage offset in a second plurality of modulated data packets, transmitting a second radio frequency signal comprising the second plurality of modulated data packets by the transmit chain, causing a portion of the second radio frequency signal to be provided to the receive chain, determining a second DC voltage of another baseband signal provided by the receive chain, the other baseband signal based on the portion of the second radio frequency signal, determining a DC voltage offset compensation based on the first and second DC voltages and on the DC voltage offset; and causing the DC voltage offset compensation to be used to transmit signals.

In accordance with at least one example of the disclosure, an integrated circuit comprises a transmit chain comprising an in-phase transmit portion and a quadrature transmit portion, a receive chain comprising an in-phase receive portion and a quadrature receive portion, a processor coupled to the transmit and receive chains, and a non-transitory storage coupled to the processor and storing executable code. When executed by the processor, the executable code causes the processor to cause a portion of a radio frequency (RF) signal transmitted by the transmit chain to be provided to the receive chain, to determine a first in-phase direct current (DC) voltage of an in-phase baseband signal provided by the in-phase receive portion of the receive chain, the in-phase baseband signal based on the portion of the RF signal, to determine a first quadrature DC voltage of a quadrature baseband signal provided by the quadrature receive portion of the receive chain, the quadrature baseband signal based on the portion of the RF signal, to introduce a DC voltage offset into a plurality of modulated data packets and provide the plurality of modulated data packets to the in-phase portion of the transmit chain, to provide a plurality of modulated data packets to the quadrature portion of the transmit chain, after the provision of the plurality of modulated data packets to the transmit chain, to determine a second in-phase DC voltage of another in-phase baseband signal provided by the in-phase portion of the receive chain based on the portion of the RF signal, after the provision of the plurality of modulated data packets to the transmit chain, to determine a second quadrature DC voltage of another quadrature baseband signal provided by the quadrature portion of the receive chain based on the portion of the RF signal, to determine an in-phase DC voltage offset compensation based on the first and second in-phase DC voltages, based on the first and second quadrature DC voltages, and based on the DC voltage offset, to determine a quadrature DC voltage offset compensation based on the first and second in-phase DC voltages, based on the first and second quadrature DC voltages, and based on the DC voltage offset, and to cause the in-phase DC voltage offset compensation and the quadrature DC voltage offset compensation to be used to transmit signals.

BRIEF DESCRIPTION OF THE DRAWINGS

For a detailed description of various examples, reference will now be made to the accompanying drawings in which:

FIG. 5 shows a portion of an auxiliary receive path in accordance with various examples; and FIG. 6 shows a flow chart of a method of radio transmitting in accordance with various examples.

DETAILED DESCRIPTION

Figure 1:
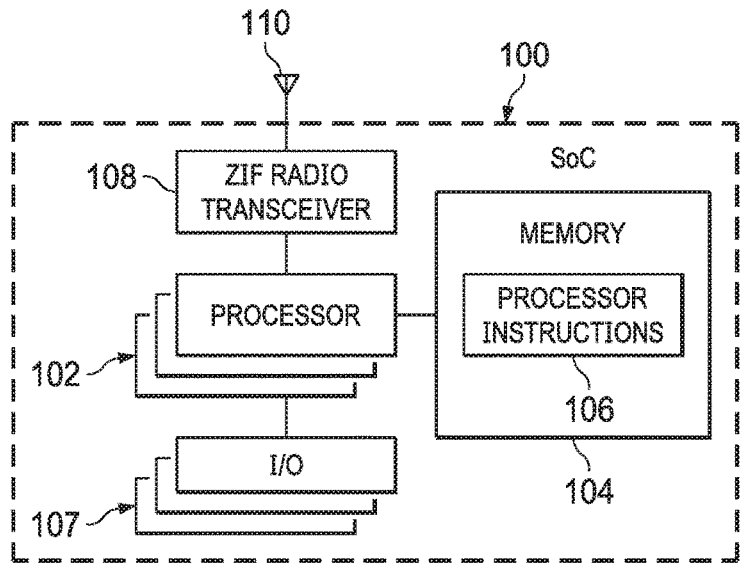
FIG. 1 shows a system on a chip (SoC) in accordance with various examples.

Zero intermediate frequency (ZIF) radio transmitters can experience local oscillator (LO) leakage into the radio frequency transmission. This LO leakage emission can cause an undesirable constant wave or continuous wave component in the transmitted radio signal. To avoid this problem, ZIF radio transmitters may determine a direct current (DC) voltage offset compensation and apply this DC voltage offset compensation in the digital domain, in the analog domain, or in both digital domain and analog domain of the ZIF radio transmitter. This process is sometimes referred to as LO leakage self-calibration. In some contexts, DC voltage offset compensation may be referred to as local oscillator leakage compensation.

A problem can arise from traditional LO leakage self-calibration because the procedure may involve iterative calibration using relatively high power signals which can wastefully expend electric power, for example by prematurely discharging and depleting batteries. Also, traditional LO leakage self-calibration may emit radio patterns (e.g., radio frequency pulses) that are similar to radar emissions. Because WiFi access points (APs) in the Unlicensed National Information Infrastructure (UNII) 5 GHz radio band are required by the FCC and other regulatory bodies to detect radar emissions and to cease transmitting when radar is active, traditional LO leakage self-calibration can interfere with the operation of such WiFi APs (e.g., the WiFi APs detect the LO leakage self-calibration emission, impute that emission to a radar, and stop transmitting). Additionally, a radio transmitter using the traditional LO leakage self-calibration runs a risk of violating regulatory constraints on power spectral density, because the calibration signal may be of high power and narrow bandwidth.

The present disclosure teaches a novel technique of LO leakage self-calibration that avoids the problems described above. The new technique involves performing the LO leakage self-calibration while transmitting bearer traffic, e.g., while transmitting actual packets of data content. This kind of transmission does not resemble radar transmissions and hence does not cause WiFi APs to cease transmission. Additionally, the new method may consume less power and hence mitigates the problem of premature depletion of battery energy because it transmits at modest power levels and may complete calibration in less time than the traditional LO leakage self-calibration process.

In examples of the LO leakage self-calibration, a bearer traffic radio signal is transmitted by a transmit chain of a radio transceiver, and a receive chain of the radio transceiver is turned on during that transmission. Some of the radio signal couples back into the receive chain, and a first DC voltage of a received baseband signal is determined. Then the transmit chain again transmits a bearer traffic radio signal, but now with a pre-defined DC offset introduced into the transmitted baseband signal. The receive chain determines a second DC voltage of the received baseband signal. The DC voltage offset compensation is determined from the second DC voltage, from the first DC voltage, and from the pre-defined DC offset. In an example, a low noise amplifier (LNA) of the receive chain is disabled during the LO leakage self-calibration process, and the radio signal couples back into a tank circuit of the receive chain.

In another example, the radio transceiver comprises an auxiliary receive chain comprising an attenuator, a mixer (e.g., a down-converter), and a local oscillator. In this example, during the LO leakage self-calibration process, the LNA, the tank circuit, and a mixer of the receive chain are disabled. During LO leakage self-calibration, the attenuator of the auxiliary receive chain is coupled to an antenna that transmits the radio signal, and the mixer of the auxiliary receive chain is coupled to a variable gain amplifier (VGA) of the receive chain downstream of the mixer of the receive chain. In this alternative example, the radio signal couples into the receive chain via the auxiliary receive chain.

Turning now to FIG. 1, a system on a chip (SoC) 100 is described. In an example, the SoC 100 comprises one or more processors 102, a memory 104 storing processor instructions 106, one or more input and/or output interfaces I/O 107, and a zero intermediate frequency (ZIF) radio transceiver 108. In other examples, however, the one or more processors 102, the memory 104, the I/O 107, and the ZIF radio transceiver 108 may not be implemented as a SoC but may be implemented by two or more integrated circuits or components. The memory 104 comprises a non-transitory memory portion, and the processor instructions 106 are stored in the non-transitory memory portion of the memory 104. The ZIF radio transceiver 108 may be coupled to an external antenna 110, for example an antenna that is part of a system in which the SoC 100 is installed. The SoC 100 is implemented as an integrated circuit (IC). The SoC 100 may find application in WiFi access points (APs), cellular base stations, cellular mobile communication devices, Bluetooth radio devices, and other radio devices. The SoC 100 may be embedded in industrial sensors and remote control appliances.

The processor 102 may read the processor instructions 106 from the memory 104 and execute the processor instructions 106. In an example, some of the processor instructions 106 may cause the processor 102 to modulate signals to be transmitted by the ZIF radio transceiver 108 and demodulate signals received by the ZIF radio transceiver 108. In an example, some of the processor instructions 106 may cause the processor 102 to perform a local oscillator leakage calibration procedure in coordination with the ZIF radio transceiver 108 and cause configuration parameters and trim codes in the ZIF radio transceiver 108 to be set to reduce or eliminate local oscillator leakage impairment. In another example, the ZIF radio transceiver 108 may modulate signals received from the processor 102 and transmit the modulated signals via the antenna 110 and demodulate signals received via the antenna 110 and provide the demodulated signals to the processor 102. In another example, the ZIF radio transceiver 108 may perform the local oscillator leakage calibration procedure and configure its parameters and its trim codes based on that procedure. In general, executing the processor instructions 106 causes the processor 102 to perform or cause the performance of one or more of the actions described herein.

Figure 2:
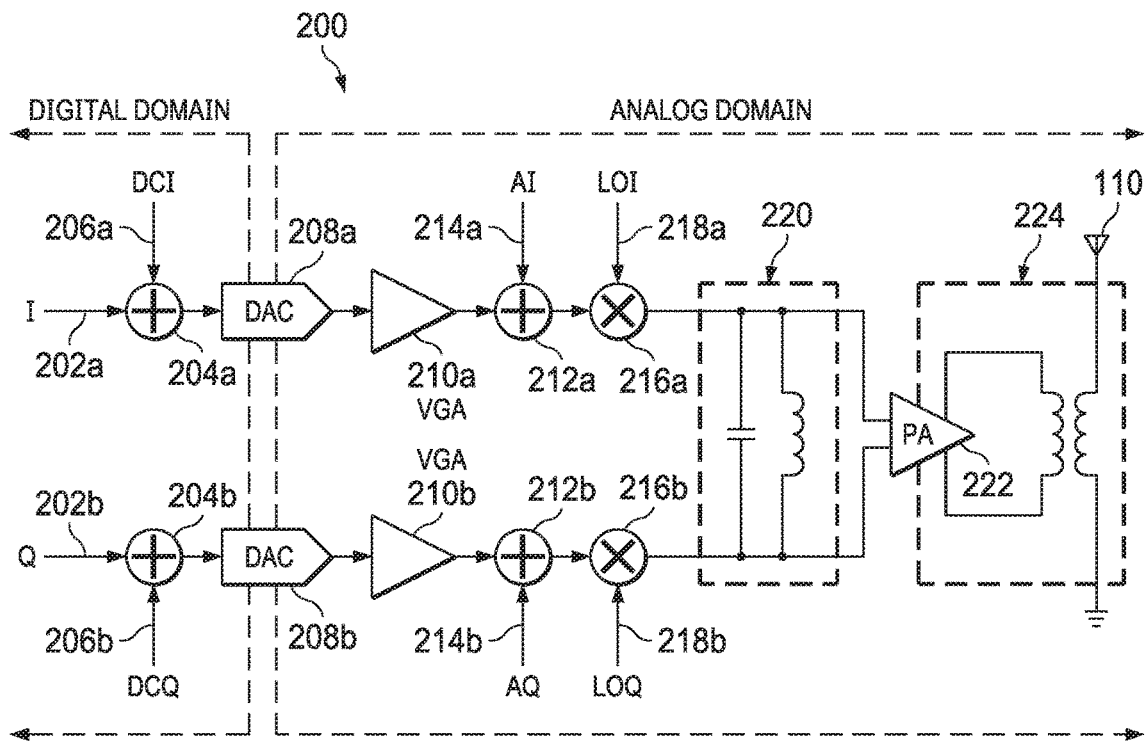
FIG. 2 shows a portion of a radio transmitter in accordance with various examples.

Turning now to FIG. 2, a radio transmitter 200 portion of the ZIF radio transceiver 108 is described. In an example, the radio transmitter 200 comprises an in-phase portion and a quadrature portion. In an example, the in-phase portion of the radio transmitter 200 comprises a first digital adder 204a, a first digital to analog converter (DAC) 208a, a first variable gain amplifier (VGA) 210a, a first analog adder 212a, and a first mixer (e.g., first up-converter) 216a. In an example, the quadrature portion of the radio transmitter 200 comprises a second digital adder 204b, a second DAC 208b, a second VGA 210b, a second analog adder 212b, and a second mixer (e.g., second up-converter) 216b. In an example, the radio transmitter 200 further comprises a first tank circuit 220 and a power amplifier (PA) 222. In an example, the PA 222 may comprise a plurality of amplifiers, for example a cascade of amplifiers. In an example, the radio transmitter 200 may comprise a balun 224. Alternatively, the balun 224 may be external to the radio transmitter 200 and external to the SoC 100. The radio transmitter 200, exclusive of the antenna 110, may be referred to as a transmit chain. In an example, the balun 224 may not be part of the transmit chain. The DACs 208a, 208b, the analog summers 212a, 212b, the mixers 216a, 216b, the tank circuit 220, the PA 222, and optionally the balun 224 may be referred to as an analog transmit chain.

An in-phase input 202a (labeled 'I' in FIG. 2) comprises a sequence of digital values representing an I-channel baseband signal, and a quadrature input 202b (labeled 'Q' in FIG. 2) comprises a sequence of digital values representing a Q-channel baseband signal. The I-channel baseband signal and the Q-channel baseband signal may be provided by a digital modulator that may be a portion of the ZIF radio transceiver 108 or that may be implemented by one or more of the processors 102. The baseband signals may comprise packetized data. Said in other words, the sequence of digital values forming the baseband signal may comprise a plurality of data packets. Alternatively, the baseband signals may comprise content encoded in a different format (e.g., not encoded as data packets).

A first input of the first digital adder 204a receives the in-phase input 202a and a second input of the first digital adder 204a is coupled to an in-phase direct current (DC) offset 206a (labeled 'DCI' in FIG. 2). An output of the first digital adder 204a is coupled to an input of the first DAC 208a. An output of the first DAC 208a is coupled to an input of the first VGA 210a. An output of the first VGA 210a is provided to a first input of the first analog adder 212a, and an in-phase analog DC offset 214a (labeled 'AI' in FIG. 2) is coupled to a second input of the first analog adder 212a. An output of the first analog adder 212a is coupled to a first input of the first mixer 216a, and a first local oscillator input 218a (labeled 'LOI' in FIG. 2) is provided to a second input of the first mixer 216a. The first local oscillator input 218a may be provided from a first local oscillator circuit of the radio transmitter 200 or of the ZIF radio transceiver 108, for example from a phase locked loop (PLL) circuit or based on the output of a PLL circuit. In an example, the first local oscillator input 218a is developed by conditioning or adapting the output of a PLL circuit, for example by dividing the output of the PLL circuit.

A first input of the second digital adder 204b receives the quadrature input 202b and a second input of the second digital adder 204b receives a quadrature DC offset 206b (labeled 'DCQ' in FIG. 2). An output of the second digital adder 204b is coupled to an input of the second DAC 208b. An output of the second DAC 208b is coupled to an input of the second VGA 210b. An output of the second VGA 210b is coupled to a first input of the second analog adder 212b and a quadrature analog DC offset 214b (labeled 'AQ' in FIG. 2) is provided to a second input of the second analog adder 212b. An output of the second analog adder 212b is coupled to a first input of the second mixer 216b, and a second input of the second mixer 216b receives a second local oscillator input 218b (labeled 'LOQ' in FIG. 2). The second local oscillator input 218b may be provided from a second local oscillator circuit of the radio transmitter 200 or of the ZIF radio transceiver 108, for example from a PLL circuit or based on the output of a PLL circuit. In an example, the local oscillator inputs 218a, 218b may be based on the output of the same PLL circuit, and the second local oscillator input 218b is shifted 90 degrees in phase relative to the first local oscillator input 218a. In an example, the second local oscillator input 218b is developed by conditioning or adapting the output of a PLL circuit, for example by dividing the output of the PLL circuit.

An output of the first mixer 216a and an output of the second mixer 216b are combined by the tank circuit 220 and amplified by the PA 222. The PA 222 may be coupled to an external antenna (e.g., antenna 110) by the balun 224. The portion of the radio transmitter 200 to the left of a dotted line cutting through the DACs 208a, 208b may be considered to perform digital domain processing, and the portion of the radio transmitter 200 to the right of the dotted line cutting through the DACs 208a, 208b may be considered to perform analog domain processing. The DACs 208a, 208b bridge the digital domain to the analog domain and may be considered to be partly in the digital domain and partly in the analog domain.

The I-channel baseband signal is offset by the first digital adder 204a that adds the in-phase DC offset 206a to the I-channel baseband signal. This in-phase DC offset 206a compensates, at least in part, for LO leakage impairment. The compensated I-channel baseband signal is converted to an I-channel analog baseband signal by the first DAC 208a. The I-channel analog baseband signal is amplified by the first VGA 210a. The amplified I-channel analog baseband signal is offset by the first analog adder 212a that adds the in-phase analog DC offset 214a to the amplified I-channel analog baseband signal. This in-phase analog DC offset 214a compensates, at least in part, for LO leakage impairment. In an example, large amplitude LO leakage impairment compensation may be provided by the in-phase analog DC offset 214a, and low amplitude LO leakage impairment compensation may be provided by the in-phase DC offset 206a, whereby a dynamic range of the first DAC 208a may be preserved. In an example, the analog DC offset 214 may be used first to compensate for large amplitude LO leakage impairment, and the DC offset 206 (e.g., digital DC offset) may be used thereafter to compensate for small amplitude LO leakage impairment and make fine adjustments, because the analog DC offset 214 may provide coarse adjustments. The in-phase LO leakage impairment compensation provided by the in-phase DC offset 206a and by the in-phase analog DC offset 214a can compensate both leakage of some of the first local oscillator input 218a into the output of the first mixer 216a but also can compensate for other DC voltages that may be present at the input to the first mixer 216a. The first mixer 216a modulates the compensated amplified I-channel analog baseband signal onto a radio frequency carrier (e.g., up-converts) for radio transmission.

The Q-channel baseband signal is offset by the second digital adder 204b that adds the quadrature DC offset 206b to the Q-channel baseband signal. This quadrature DC offset 206b compensates, at least in part, for LO leakage impairment. The compensated Q-channel baseband signal is converted to a Q-channel analog baseband signal by the second DAC 208b. The Q-channel analog baseband signal is amplified by the second VGA 210b. The amplified Q-channel analog baseband signal is offset by the second analog adder 212b that adds the quadrature analog DC offset 214b to the Q-channel analog amplified baseband signal. This quadrature analog DC offset 214b compensates, at least in part, for LO leakage impairment. In an example, large amplitude LO leakage impairment compensation may be provided by the quadrature analog DC offset 214b, and low amplitude LO leakage impairment compensation may be provided by the quadrature DC offset 206b, whereby a dynamic range of the second DAC 208b may be preserved. The quadrature LO leakage impairment compensation provided by the quadrature DC offset 206b and by the quadrature analog DC offset 214b can compensate both leakage of some of the second local oscillator input 218b into the output of the second mixer 216b but also can compensate for other DC voltages that may be present at the input to the second mixer 216b. The second mixer 216b modulates the compensated amplified Q-channel analog baseband signal onto a radio frequency carrier (e.g., up-converts) for radio transmission.

The radio frequency outputs of the first and second mixers 216a, 216b are combined by the first tank circuit 220. The first tank circuit 220 may provide impedance matching between the mixers 216a, 216b and the PA 222 as well as filtering out undesired frequency components in the radio frequency outputs of the first and second mixers 216a, 216b. The output of the first tank circuit 220 is amplified by the PA 222. The output of the PA 222 may be provided to the antenna 110 by the balun 224. The antenna 110 may emit the radio signal generated by the radio transmitter 200.

Figure 3:
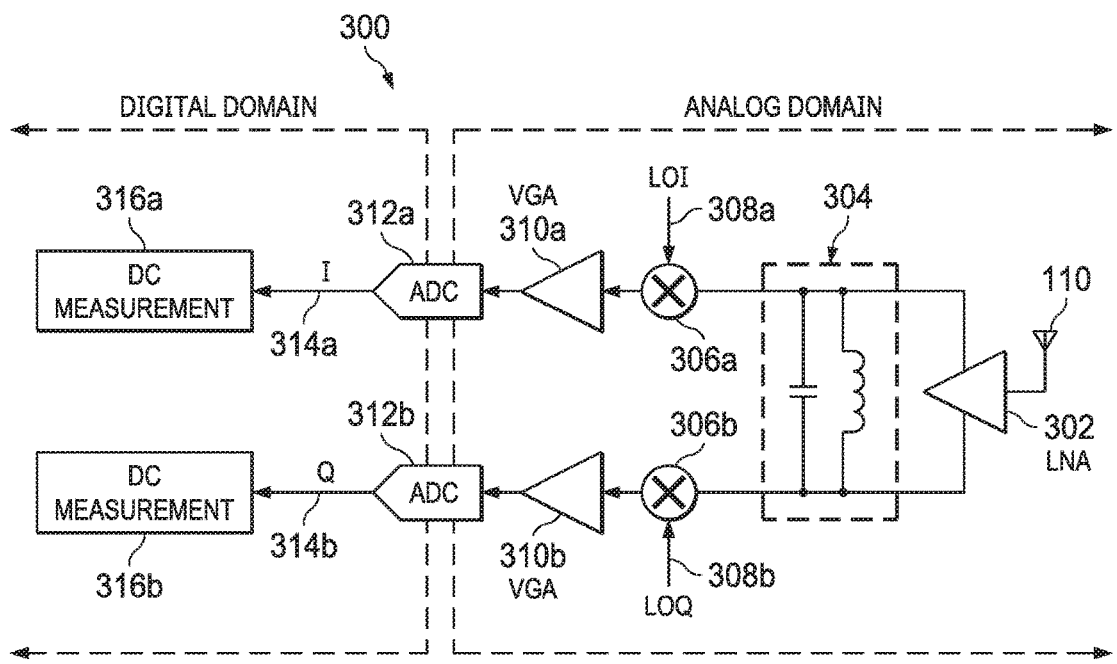
FIG. 3 shows a portion of a radio receiver in accordance with various examples.

Turning now to FIG. 3, a radio receiver 300 portion of the ZIF radio transceiver 108 is described. In an example, the radio receiver 300 comprises an in-phase portion and a quadrature portion. In an example, the radio receiver 300 comprises a low noise amplifier (LNA) 302 and a second tank circuit 304. In an example, the in-phase portion of the radio receiver 300 comprises a third mixer 306a (e.g., down-converter), a third VGA 310a, and a first analog to digital converter (ADC) 312a. In an example, the quadrature portion of the radio receiver 300 comprises a fourth mixer 306b (e.g., down-converter), a fourth VGA 310b, and a second ADC 312b. In an example, the radio receiver 300 further comprises an I-channel DC measurement block 316a and a Q-channel DC measurement block 316b. In an example, the DC measurement blocks 316a, 316b are implemented as hardware components. In an alternative example, the DC measurement blocks 316a, 316b are implemented in software and are provided by executing instructions in a processor of the ZIR radio transceiver 108 or in one of the processors 102 of the SoC 100. The radio receiver 300, excluding the antenna 110, may be referred to as a receive chain. The LNA 302, the second tank circuit 304, the mixers 306a, 306b, the VGAs 310a, 310b, and the ADCs 312a, 312b may be referred to as an analog receive chain.

An input of the LNA 302 may be coupled to an antenna 110. An output of the LNA 302 is coupled to the second tank circuit 304. A first output of the second tank circuit 304 is coupled to a first input of the third mixer 306a, and a second output of the second tank circuit 304 is coupled to a first input of the fourth mixer 306b. In an example, a first trans-admittance amplifier may be provided between the second tank circuit 304 and the third mixer 306a and a second trans-admittance amplifier may be provided between the second tank circuit 304 and the fourth mixer 306b. In an example, the trans-admittance amplifiers may be used to convert from voltage domain to current domain circuitry. A second input of the third mixer 306a is coupled to a third local oscillator input 308a (labeled 'LOI' in FIG. 3). The third local oscillator input 308a may be provided from a third local oscillator circuit of the radio receiver 300 or of the ZIF radio transceiver 108, for example from a PLL circuit or based on the output of a PLL circuit. In an example, the third local oscillator input 308a may be based on the output of the same PLL circuit that the local oscillator inputs 218a and 218b are based on. In an example, the third local oscillator input 308a is developed by conditioning or adapting the output of a PLL circuit, for example by dividing the output of the PLL circuit.

An output of the third mixer 306a is coupled to an input of the third VGA 310a. An output of the third VGA 310a is coupled to an input of the first ADC 312a. An output of the first ADC 312a is an I-channel output 314a (labeled 'I' in FIG. 3). The I-channel output 314a comprises a sequence of digital values representing an I-channel received baseband signal. The I-channel output 314a is provided to a first input of the I-channel DC measurement block 316a. A second input of the fourth mixer 306b receives the fourth local oscillator input 308b (labeled 'LOQ' in FIG. 3). The fourth local oscillator input 308b may be provided from a fourth local oscillator circuit of the radio receiver 300 or of the ZIF radio transceiver 108, for example from a PLL circuit or based on the output of a PLL circuit. In an example, the local oscillator inputs 308a, 308b may be based on the output of the same PLL circuit, and the fourth local oscillator input 308b is shifted 90 degrees in phase relative to the third local oscillator input 308a. In an example, the local oscillator inputs 218a, 218b, 308a, and 308b are based on the output of the same PLL circuit, with appropriate 90 degree phase shifts for local oscillator inputs 218b and 308b. In an example, the fourth local oscillator input 308b is developed by conditioning or adapting the output of a PLL circuit, for example by dividing the output of the PLL circuit.

An output of the fourth mixer 306b is coupled to an input of the fourth VGA 310b. An output of the fourth VGA 310b is coupled to an input of the second ADC 312b. An output of the second ADC 312b is a Q-channel output 314b (labeled 'Q' in FIG. 3). The Q-channel output 314b comprises a sequence of digital values representing a Q-channel received baseband signal. The Q-channel output 314b is provided to an input of the Q-channel DC measurement block 316b.

In operation, a radio signal is received by the antenna 110 and provided to the LNA 302. The LNA 302 amplifies the received radio signal and outputs an amplified radio signal to the second tank circuit 304. The second tank circuit 304 outputs an amplified radio signal to the first input of the third mixer 306a and to the first input of the fourth mixer 306b. The third mixer 306a down-converts the amplified radio signal to an !-channel received baseband signal based on the third local oscillator input 308a and provides the I-channel received baseband signal to the input of the third VGA 310a. The third VGA 310a amplifies the I-channel received baseband signal and outputs an amplified I-channel received baseband signal to the first ADC 312a. The first ADC 312a converts the amplified I-channel received baseband signal from an analog value to a sequence of digital values (e.g., an I-channel digital received baseband signal) and outputs the sequence of digital values as the I-channel output 314a. The I-channel output 314a is provided to the I-channel DC measurement block 316a and to a demodulator component of the ZIF radio transceiver 108 and/or to a processor 102 for demodulating.

The fourth mixer 306b down-converts the amplified radio signal to a Q-channel received baseband signal based on the fourth local oscillator input 308b and provides the Q-channel received baseband signal to the input of the fourth VGA 310b. The fourth VGA 310b amplifies the Q-channel received baseband signal and outputs an amplified Q-channel received baseband signal to the second ADC 312b. The second ADC 312b converts the amplified Q-channel received baseband signal from an analog value to a sequence of digital values (e.g., a Q-channel digital received baseband signal) and outputs the sequence of digital values as the Q-channel output 314b. The Q-channel output 314b is provided to the Q-channel DC measurement block 316b and to a demodulator component of the ZIF radio transceiver 108 and/or to a processor 102 for demodulating.

Referring to FIG. 2 and FIG. 3, to determine the in-phase DC offset 206a and the quadrature DC offset 206b, a LO leakage self-calibration procedure may be performed. In an example, the LO leakage self-calibration procedure may be performed by the radio transmitter 200 and radio receiver 300 under control of the processor 102 executing some of the processor instructions 106. Alternatively, in an example, the LO leakage self-calibration procedure may be performed by the radio transmitter 200 and the radio receiver 300, substantially autonomously from the processor 102. In an example, the processor 102 may cause the radio transmitter 200 and the radio receiver 300 to perform the LO leakage self-calibration procedure, and then the radio transmitter 200 and the radio receiver 300 complete the LO leakage self-calibration procedure substantially autonomously. In an example, the radio transmitter 200 or the ZIF radio transceiver may comprise a processor that executes instructions to perform steps of the LO leakage self-calibration procedure.

One approach is to transmit packet data via the radio transmitter 200, couple the radio signal in the radio transmitter 200 back into the radio receiver 300, measure the DC component in the received baseband signal, determine appropriate DC voltage offset compensation based on the measured DC component in the received baseband signal, and introduce the DC voltage offset compensation via the DC offsets 206a, 206b. In an example, the LO leakage self-calibration procedure may transmit a different baseband signal that does not contain packet data.

If the DC voltage offset compensation is large enough to reduce the dynamic range of the DACs 208a, 208b, the DC voltage offset compensation may be introduced via the analog DC offsets 214a, 214b and the LO leakage self-calibration procedure may be repeated. After having first reduced the LO leakage impairment with analog DC offsets 214a, 214b in the first iteration of the LO leakage self-calibration procedure, it can be expected that the DC voltage offset compensation determined by a second iteration of the LO leakage self-calibration procedure will be relatively small and can be introduced via the DC offsets 206a, 206b without significantly reducing the dynamic range of the DACs 208a, 208b.

In an example using the receiver 300 of FIG. 3, the LO leakage self-calibration procedure relies upon coupling of the radio signal in the balun 224 into the second tank circuit 304 in the receiver 300. This coupling of the radio signal emitted by the balun 224 into the second tank circuit 304 occurs naturally as a response of the components of the second tank circuit 304 to the emission of the radio signal by the balun 224. When not performing a LO leakage self-calibration, the receiver 300 may be disabled or turned off while the transmitter 200 is active and the transmitter 200 may be disabled or turned off while the receiver 300 is active. During the LO leakage self-calibration procedure, however, at least portions of the receiver 300 are active or turned on while the transmitter 200 is active.

As a first step in the LO leakage self-calibration, a DC voltage offset of the receiver 300 (e.g., stray DC voltage offsets within the receiver 300, which may be referred to as "self-DC" in some contexts) is measured while the transmitter 200 is disabled or turned off and the LNA 302 is disabled or turned off. The self-DC of the receiver 300 may be determined by the I-channel DC measurement block 316a determining the DC component of the I-channel received baseband signal and the Q-channel DC measurement block 316b determining the DC component of the Q-channel received baseband signal. The receiver 300 is adjusted to compensate for the measured DC offset of the receiver 300 (e.g., "self-DC"), for example by changing trim codes configured into the receiver 300 and/or by adding a digital offset in the digital domain of the receiver 300).

As a second step in the LO leakage self-calibration, a set of LO leakage values are determined while the transmitter 200 is active or turned on, with the exception that the PA 222 is disabled or turned off. This step will determine radio signal leakage from the first tank circuit 220 to the second tank circuit 304 in the receiver 300, in order to adapt out that radio signal leakage from the first tank circuit 220 in the later determination of DC offsets 206a, 206b. Radio signal leakage from the first tank circuit 220 to the second tank circuit 304 may occur as the result of the first tank circuit 220 emitting radio frequency energy and the second tank circuit 304 responding to the emitted radio frequency energy. At least in a first iteration of the LO leakage self-calibration procedure, the in-phase DC offset 206a and the quadrature DC offset 206b are set to zero values.

In this configuration (e.g., the transmitter 200 is turned on but the PA 222 is turned off), the in-phase input 202a is provided to the first input of the first digital adder 204a, and the quadrature input 202b is provided to the first input of the second digital adder 204b. The I-channel DC measurement block 316a measures a first I-channel tank coupling DC value (e.g., a DC value in the I-channel output 314a attributed to the coupling of the first tank circuit 224 into the second tank circuit 304), and the Q-channel DC measurement block 316b measures a first Q-channel tank coupling DC value (e.g., a DC value in the Q-channel output 314b attributed to the coupling of the first tank circuit 224 into the second tank circuit 304). Again in this configuration (e.g., the transmitter 200 is turned on but the PA 222 is turned off), the in-phase input 202a is provided along with a pre-defined DC offset to the first input of the first digital adder 204a, and the quadrature input 202b is provided to the first input of the second digital adder 204b. In example the processor 102 causes the pre-defined DC offset to be input into the analog transmit chain by the above described process. The I-channel DC measurement block 316a measures a second I-channel tank coupling DC value, and the Q-channel DC measurement block 316b measures a second Q-channel tank coupling DC value. The first and second tank coupling DC values reflect radio signal coupling between the first tank circuit 220 and the second tank circuit 304 and will be used to cancel out the effect of this tank-to-tank radio coupling in the later determination of the DC offsets 206a, 206b.

As a third step in the LO leakage self-calibration, a set of LO leakage values are determined while all of the transmitter 200 is active or turned on, including the PA 222. This step will determine radio signal leakage from the first tank circuit 220 to the second tank circuit 304 as well as the radio signal leakage from the balun 224 to the second tank circuit 304. At least in a first iteration of the LO leakage self-calibration procedure, the in-phase DC offset 206a and the quadrature DC offset 206b are set to zero values.

In this configuration (e.g., all of the transmitter 200 is turned on, including the PA 222), the in-phase input 202a is provided to the first input of the first digital adder 204a, and the quadrature input 202b is provided to the first input of the second digital adder 204b. The I-channel DC measurement block 316a measures a first I-channel aggregate coupling DC value (e.g., a sum or aggregation of the DC value in the I-channel output 314a attributed to the coupling of the first tank circuit 224 into the second tank circuit 304 plus a DC value in the I-channel output 314a attributed to the coupling of the balun 224 into the second tank circuit 304), and the Q-channel DC measurement block 316b measures a first Q-channel aggregate coupling DC value (e.g., a sum or aggregation of the DC value in the Q-channel output 314b attributed to the coupling of the first tank circuit 224 into the second tank circuit 304 plus a DC value in the Q-channel output 314b attributed to the coupling of the balun 224 into the second tank circuit 304). Again in this configuration (e.g., all of the transmitter 200 is turned on including the PA 222), the in-phase input 202a is provided along with the pre-defined DC offset (the same pre-defined DC offset used in the second step above) to the first input of the first digital adder 204a, and the quadrature input 202b is provided to the first input of the second digital adder 204b. The I-channel DC measurement block 316a measures a second I-channel aggregate coupling DC value, and the Q-channel DC measurement block 316b measures a second Q-channel aggregate coupling DC value.

As a fourth step in the LO leakage self-calibration, a first I-channel balun coupling DC value (e.g., a DC value in the I-channel output 314a attributed to the coupling of the radio signal emitted by the balun 224 into the second tank circuit 304) is determined as the difference between the first I-channel aggregate coupling DC value and the first I-channel tank coupling DC value, and a first Q-channel balun coupling DC value is determined as the difference between the first Q-channel aggregate coupling DC value and the first Q-channel tank coupling DC value. A second I-channel balun coupling DC value is determined as the difference between the second I-channel aggregate coupling DC value and the second I-channel tank coupling DC value, and a second Q-channel balun coupling DC value is determined as the difference between the second Q-channel aggregate coupling DC value and the second Q-channel tank coupling DC value.

As a fifth step in the LO leakage self-calibration, a gain is determined by determining first a difference between the second balun coupling DC value and the first balun coupling DC value and second dividing that difference by the pre-defined DC offset EQ 1 below). The second balun coupling DC value is treated as a complex number—the real part being the second I-channel balun coupling DC value and the imaginary part being the second Q-channel balun coupling DC value. The first balun coupling DC value, likewise, is treated as a complex number—the real part being the first I-channel balun coupling DC value and the imaginary part being the first Q-channel balun coupling DC value. Because the first balun coupling DC value and the second balun coupling DC value are complex numbers, the gain is a complex number. The DC offset 206 is then found as a complex number that is the negative of the quotient of the first balun coupling divided by the gain (EQ 2 below), where the I-channel DC offset 206a is the real part of this complex number (EQ 3 below), and the Q-channel DC offset 206b is the imaginary part of this complex number (EQ 4 below).

$$\text{Gain} = \frac{[DC_{2,I} + jDC_{2,Q}] - [DC_{1,I} + jDC_{1,Q}]}{\text{DC Transmit Offset}} \quad \text{EQ 1}$$

$$\text{DC Offset} = -\frac{[DC_{1,I} + jDC_{1,Q}]}{\text{Gain}} \quad \text{EQ 2}$$

$$\text{Ichannel DC offset } 206a = -\text{Real}\left\{\frac{[DC_{1,I} + jDC_{1,Q}]}{\text{Gain}}\right\} \quad \text{EQ 3}$$

$$\text{Qchannel DC offset } 206b = -\text{Imag}\left\{\frac{[DC_{1,I} + jDC_{1,Q}]}{\text{Gain}}\right\} \quad \text{EQ 4}$$

where $DC_{2,I}$ is the second I-channel balun coupling DC value, $DC_{2,Q}$ is the second Q-channel balun coupling DC value, $DC_{1,I}$ is the first I-channel balun coupling DC value, $DC_{1,Q}$ is the first Q-channel balun coupling DC value, and DC Transmit Offset is the pre-defined DC offset. In different examples, a different process of determining the DC offsets 206a, 206b may be employed. For example, the pre-defined DC offset introduced at the input of the transmitter 200 may be provided to the quadrature input 202b instead of to the in-phase input 202a. For example, an independent pre-defined DC offset may be introduced into each of the in-phase input 202a and the quadrature input 202b.

After determining the I-channel DC offset 206a and the Q-channel DC offset 206b, these values may be configured into the transmitter 200 as values stored in memory registers or firmware of the transmitter 200 or the ZIF transceiver 108. As mentioned further above, if the I-channel DC offset 206a or the Q-channel DC offset 206b is large enough to undesirably reduce the dynamic range of the DAC 208a, 208b, the analog DC offset 214a, 214b may be adjusted first, and then the LO leakage self-calibration process repeated using the DC offsets 206a, 206b. The analog DC offset 214a and the Q-channel analog DC offset 214b may be stored in memory registers or firmware in the transmitter 200 or the ZIF transceiver 108.

The LO calibration process may be performed periodically, for example once per day, once per week, or once per month. This periodic LO calibration may promote adapting the transmitter 200 as hardware ages. The LO calibration process may be performed on events, such as when switching from a first transmission channel to a second transmission channel (e.g., where the different channels are associated with different frequency ranges). The LO calibration process may be performed when temperature of the transmitter 200 and/or ZIF transceiver 108 has changed by more than a threshold temperature amount or if an environment in which the SoC 100 operates has changed by more than a threshold temperature amount. The LO calibration process may be performed in response to other events, for example when changing coupling to antennas in a multi-antenna deployment of the SoC 100. The LO calibration process may be performed on initial power on of the SoC 100 and/or of the ZIF transceiver 108.

Figure 4:
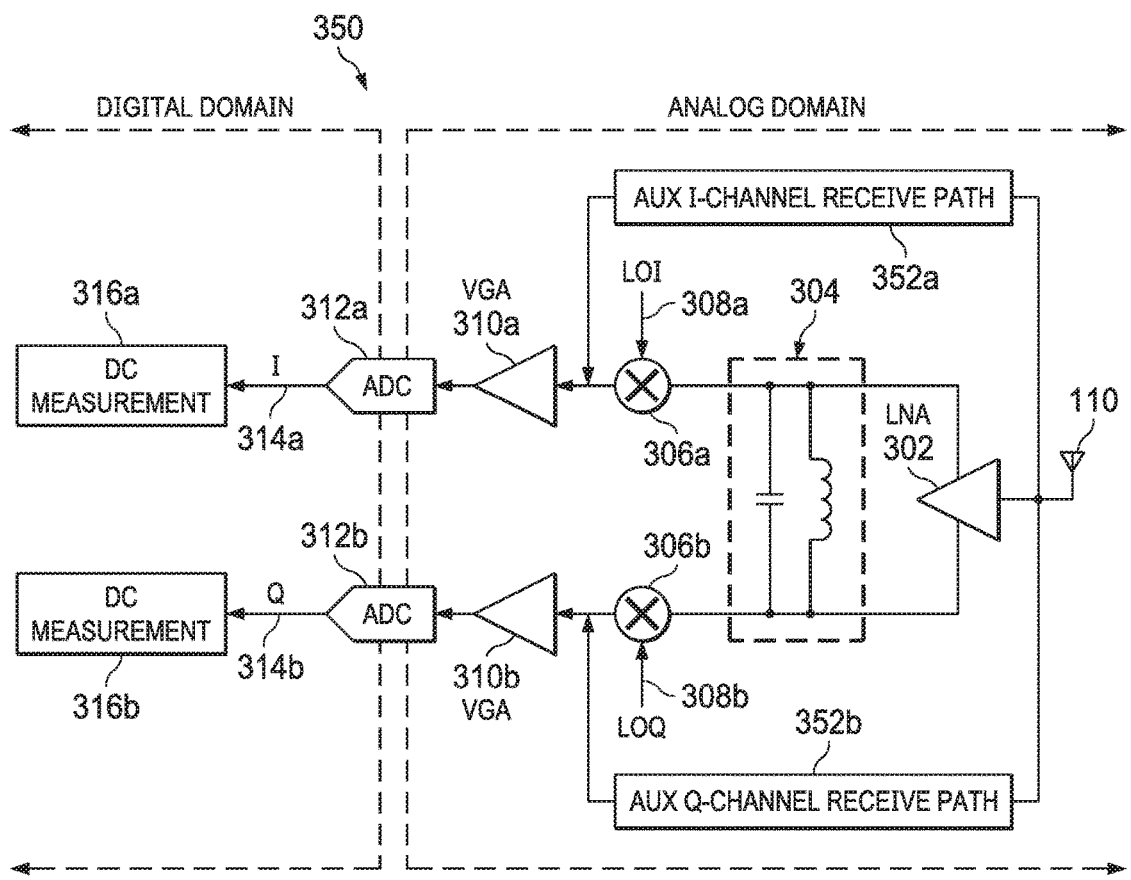
FIG. 4 shows a portion of another radio receiver in accordance with various examples.

Turning now to FIG. 4, another radio receiver 350 is described. The radio receiver 350 comprises an auxiliary receive path for use in performing LO calibration and may provide some advantages with reference to the radio receiver 350. In an example, the use of an auxiliary receive path may simplify the process of LO leakage self-calibration. In an example, the use of an auxiliary receive path may make the LO leakage self-calibration more accurate. In an example, the radio receiver 350 comprises the components of the radio receiver 300 but additionally comprises an auxiliary I-channel receive path 352a coupled between an input to the LNA 302 and the output of the third mixer 306a and an auxiliary Q-channel receive path 352b coupled between the input of the LNA 302 and the output of the fourth mixer 306b. In an example, a first switch may couple one of the output of the third mixer 306a or an output of the auxiliary I-channel receive path 352a to the input of the third VGA 310a, and a second switch may couple one of the output of the fourth mixer 306b or an output of the auxiliary Q-channel receive path 352b to the input of the fourth VGA 310b. Turning now to FIG. 5, details of the auxiliary receive paths 352a, 352b (collectively auxiliary receive path 352) are described. In an example, the auxiliary receive path 352 comprises an attenuator 360, a fifth mixer (e.g., down-converter) 362, and a fifth local oscillator input 364. The fifth local oscillator input 364 may be provided from a fifth local oscillator circuit of the radio receiver 350 or of the ZIF radio transceiver 108, for example from a PLL circuit or based on an output of a PLL circuit. In an example, the fifth local oscillator input 364 may be based on the output of the same PLL circuit on which the local oscillator inputs 218a, 218b, 308a, and 308b are based. The fifth local oscillator input 364 may be developed by conditioning or adapting the output of a PLL circuit, for example by dividing the output of the PLL circuit. In an example, in the Q-channel receive path 352b, the fifth local oscillator input 364 may be phase shifted by 90 degrees.

With reference to FIG. 2, FIG. 4, and FIG. 5, when a LO leakage self-calibration is performed for a ZIF transceiver 108 that has the receiver 350, some steps of the LO leakage self-calibration described with reference to FIG. 3 may be omitted because the tank coupling can be eliminated during the LO leakage self-calibration process. The second step in the LO leakage self-calibration described above (e.g., the determination of radio signal leakage from the first tank circuit 220 to the second tank circuit 304) is eliminated. Additionally, the fourth step in the LO leakage self-calibration described above is eliminated. In addition to simplifying the LO leakage self-calibration process, the LO leakage self-calibration process may be more accurate (relative to the LO leakage self-calibration process based on the receiver 300 that does not have the auxiliary receive paths 352a, 352b) because the radio signal is more adequately coupled to the auxiliary receive paths 352a, 352b.

In a LO leakage self-calibration process, for example, using the receiver 350, the first step of determining and compensating a self-DC of the receiver 350 is performed substantially as described above. The second step determines a first I-channel DC value and a first Q-channel DC value. The LNA 302, the third tank circuit 304, the third mixer 306a, and the fourth mixer 306b are disabled or turned off. The auxiliary I-channel receive path 352a and the auxiliary Q-channel receive path 352b are enabled and turned on (e.g., the auxiliary channel receive paths 352a, 352b are turned on, the attenuator 360 is coupled to the antenna 110, the fifth local oscillator circuits associated to each of the receive paths 352a, 352b are turned on and each local oscillator input 364 is provided to each corresponding mixer 362, and an output of the mixer 362 is coupled to the VGA 310a, 310b, for example by controlling switches selecting output of the auxiliary channel receive paths 352a, 352b and deselecting the output of the mixers 306a, 306b). All of the transmitter 200 is turned on, including the PA 222, the in-phase input 202a is provided to the first input of the first digital adder 204a, and the quadrature input 202b is provided to the first input of the second digital adder 204b. The I-channel DC measurement block 316a measures a first I-channel received DC value, and the Q-channel DC measurement block 316b measures a first Q-channel received DC value. Next the in-phase input 202a is provided along with the pre-defined DC offset to the first input of the first digital adder 204a, and the quadrature input 202b is provided to the first input of the second digital adder 204b. The I-channel DC measurement block 316a measures a second I-channel received DC value, and the Q-channel DC measurement block 316b measures a second Q-channel received DC value.

A third step of the LO leakage self-calibration comprises determining the DC offset 206 based on the pre-defined DC offset and based on the first and second received DC values. A gain is determined by determining first a difference between the second received DC value and the first received DC value and second dividing that difference by the pre-defined DC offset (EQ 1' below). The second received DC value is treated as a complex number—the real part being the second I-channel received DC value and the imaginary part being the second Q-channel received DC value. The first received DC value, likewise, is treated as a complex number—the real part being the first I-channel received DC value and the imaginary part being the first Q-channel received DC value. Because the first received DC value and the second received DC value are complex numbers, the gain is a complex number. The DC offset 206 is then found as a complex number as the negative of the quotient of the first received DC value divided by the gain (EQ 2' below), where the I-channel DC offset 206a is the real part of this complex number (EQ 3' below), and the Q-channel DC offset 206b is the imaginary part of this complex number (EQ 4' below).

$$\text{Gain} = \frac{[DC_{2,I} + JDC_{2,Q}] - [DC_{1,I} + JDC_{1,Q}]}{\text{DC Transmit Offset}} \qquad \text{EQ 1'}$$

$$\text{DC Offset} = -\frac{[DC_{1,I} + JDC_{1,Q}]}{\text{Gain}} \qquad \text{EQ 2'}$$

$$I\text{channel DC offset } 206a = -\text{Real}\left\{\frac{[DC_{1,I} + JDC_{1,Q}]}{\text{Gain}}\right\} \qquad \text{EQ 3'}$$

$$Q\text{channel DC offset } 206b = -\text{Imag}\left\{\frac{[DC_{1,I} + JDC_{1,Q}]}{\text{Gain}}\right\} \qquad \text{EQ 4'}$$

where $DC_{2,I}$ is the second I-channel received DC value, $DC_{2,Q}$ is the second Q-channel received DC value, $DC_{1,I}$ is the first I-channel received DC value, $DC_{1,Q}$ is the first Q-channel received DC value, and DC Transmit Offset is the pre-defined DC offset. In different examples, a different process of determining the DC offset 206a, 206b may be employed. For example, the pre-defined DC offset introduced at the input of the transmitter 200 may be provided to the quadrature input 202b instead of to the in-phase input 202a.

After determining the I-channel DC offset 206a and the Q-channel DC offset 206b, these values may be configured into the transmitter 200 as values stored in memory registers or firmware of the transmitter 200 or the ZIF transceiver 108. As mentioned further above, if the I-channel DC offset 206a or the Q-channel DC offset 206b is large enough to undesirably reduce the dynamic range of the DAC 208a, 208b, the analog DC offset 214a, 214b may be adjusted first using a similar calibration process, and then the LO leakage self-calibration process repeated. After completing LO leakage self-calibration, the auxiliary I-channel receive path 352a and the auxiliary Q-channel receive path 352b are disabled and turned off and the LNA 302, the third tank circuit 304, the third mixer 306a, and the fourth mixer 306b are enabled and turned on.

While a ZIF transceiver 108 comprising in-phase and quadrature channels was described above, the same structures and methods can be applied in other radio transceivers. For example, the same LO leakage self-calibration can be applied, in a simplified form, to a radio transceiver having a single in-phase transmit channel a single in-phase receive channel. Additionally, the same structures and methods can be applied to radio transceivers that are not classic ZIF transceivers, for example to a super-heterodyne radio transceiver that comprises a first stage which is ZIF and a second up-conversion stage.

Turning now to FIG. 6, a method 600 of radio transmitting is described. The method 600 may be performed by the ZIF transceiver 108 to perform a LO leakage self-calibration. At block 602, the method 600 comprises transmitting a first radio frequency signal comprising a first plurality of modulated data packets by a transmit chain of an integrated circuit (IC). The modulated data packets may comprise random or pseudo-random information content. In an example, the transmit chain may comprise an in-phase transmit chain and a quadrature transmit chain. In another example, the transmit chain comprises a single in-phase transmit chain. At block 604, the method 600 comprises causing a portion of the first radio frequency signal to be provided to a receive chain of the IC. In an example, the receive chain may comprise an in-phase receive chain and a quadrature receive chain. In another example, the receive chain may comprise an in-phase receive chain, an in-phase auxiliary receive chain, a quadrature receive chain, and an auxiliary quadrature receive chain. In yet another example, the receive chain may comprise a single in-phase receive chain. At block 606, the method 600 comprises determining a first direct current (DC) voltage of a baseband signal provided by the receive chain, the baseband signal based on the portion of the first radio frequency signal described in block 604.

At block 608, the method 600 comprises introducing a DC voltage offset in a second plurality of modulated data packets. This DC voltage offset may be a pre-defined offset value. At block 610, the method 600 comprises transmitting a second radio frequency signal comprising the second plurality of modulated data packets by the transmit chain. At block 612, the method 600 comprises causing a portion of the second radio frequency signal to be provided to the receive chain.

At block 614, the method 600 comprises determining a second DC voltage of another baseband signal provided by the receive chain, the other baseband signal based on the portion of the second radio frequency signal. At block 616, the method 600 comprises determining a DC voltage offset compensation based on the first and second DC voltages and on the DC voltage offset. At block 618, the method 600 comprises causing the DC voltage offset compensation to be used to transmit signals. For example, at block 618, the method 600 configures the DC voltage offset compensation into registers, memory, and/or firmware of the transmit chain (e.g., into the ZIF transceiver 108 and/or the radio transceiver 200). The performance of block 618 may comprise configuring values into the radio transceiver 200 and/or ZIF transceiver 108 for the DC offset 206a, 206b and/or the analog DC offset 214a, 214b. After the performance of block 618 configures the DC voltage offset compensation, the block 618 may comprise transmitting data or other content via the radio transmitter 200, where the radio transmission occurs based at least in part on the configured DC voltage offset compensation.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Unless otherwise stated, "about," "approximately," or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An integrated circuit, comprising:
an analog transmit chain;
an analog receive chain;
a processor coupled to the analog transmit and receive chains; and
a non-transitory storage coupled to the processor and storing executable code, which, when executed by the processor, causes the processor to:
cause a portion of a radio frequency (RF) signal to be transmitted by the analog transmit chain;
determine a first direct current (DC) voltage of a baseband signal provided by the analog receive chain, the baseband signal based on a portion of the RF signal received by the analog receive chain;
cause a DC voltage offset to be input into the analog transmit chain;
after the introduction of the DC voltage offset into the analog transmit chain, determine a second DC voltage of another baseband signal provided by the analog receive chain based on the portion of the RF signal;
determine a DC voltage offset compensation based on the first and second DC voltages and the DC voltage offset; and
cause the DC voltage offset compensation to be used to transmit signals.

2. The IC of claim 1, wherein the executable code, when executed, causes the processor to:
enable the analog receive chain while the analog transmit chain is transmitting; and
turn off a low noise amplifier (LNA) of the analog receive chain.

3. The IC of claim 1, further comprising:
an auxiliary analog receive chain comprising an attenuator that is configured to receive the portion of the RF signal; and
an auxiliary down converter coupled to the attenuator and coupled to a variable gain amplifier (VGA) of the analog receive chain.

4. The IC of claim 1, wherein the executable code causes the processor to configure at least a portion of the DC voltage offset compensation into digital domain transmit processing in the IC.

5. The IC of claim 4, wherein the executable code causes the processor to configure a different portion of the DC voltage offset compensation into an adder component of the analog transmit chain.

6. The IC of claim 1, wherein the DC voltage offset compensation is proportional to the product of the negative of a first term multiplied by a second term, wherein the first term is determined as a difference between the second DC voltage and the first DC voltage, and wherein the second term is determined as the quotient of the first DC voltage divided by the DC voltage offset.

7. The IC of claim 6, wherein the analog transmit chain comprises a transmit I-channel and a transmit Q-channel, the analog receive chain comprises a receive I-channel and a receive Q-channel, and wherein the DC voltage offset compensation comprises an I-channel compensation value and a Q-channel compensation value.

8. The IC of claim 1, wherein the DC voltage offset is introduced by the processor into a plurality of modulated data packets and the plurality of modulated data packets introduced by the processor into the analog transmit chain.

9. A method of radio transmitting, comprising:
transmitting a first radio frequency signal comprising a first plurality of modulated data packets by a transmit chain of an integrated circuit (IC);
causing a portion of the first radio frequency signal to be provided to a receive chain of the IC;
determining a first direct current (DC) voltage of a baseband signal provided by the receive chain, the baseband signal based on the portion of the first radio frequency signal;
introducing a DC voltage offset in a second plurality of modulated data packets;
transmitting a second radio frequency signal comprising the second plurality of modulated data packets by the transmit chain;
causing a portion of the second radio frequency signal to be provided to the receive chain;
determining a second DC voltage of another baseband signal provided by the receive chain, the other baseband signal based on the portion of the second radio frequency signal;
determining a DC voltage offset compensation based on the first and second DC voltages and on the DC voltage offset; and
causing the DC voltage offset compensation to be used to transmit signals.

10. The method of claim 9, wherein determining the DC voltage offset compensation comprises determining a first term by subtracting the first DC voltage from the second DC voltage, determining a second term by dividing the first DC voltage by the DC voltage offset, and multiplying the negative of the first term with the second term to determine the DC voltage offset compensation.

11. The method of claim 9, wherein causing the DC voltage offset compensation to be used to transmit signals comprises storing the DC voltage offset compensation.

12. The method of claim 8, wherein the IC comprises a zero intermediate frequency (ZIF) radio transceiver.

13. The method of claim 9, wherein determining the DC voltage offset compensation is performed periodically.

14. The method of claim 9, wherein determining the DC voltage offset compensation is performed in response to a predefined event.

15. The method of claim 8, wherein causing a portion of the radio frequency signal to be provided to the receive chain comprises disabling a low noise amplifier and a mixer of the receive chain and enabling an auxiliary receive chain of the IC.

16. The method of claim 15, wherein the auxiliary receive chain comprises an attenuator, and wherein enabling the auxiliary receive chain of the IC comprises coupling the attenuator to an antenna coupled to the IC.

17. The method of claim 8, wherein causing a portion of the radio frequency signal to be provided to the receive chain comprises disabling a low noise amplifier (LNA) of the receive chain and enabling a remainder of the receive chain excluding the LNA.

18. An integrated circuit, comprising:
a transmit chain comprising an in-phase transmit portion and a quadrature transmit portion;
a receive chain comprising an in-phase receive portion and a quadrature receive portion;
a processor coupled to the transmit and receive chains; and
a non-transitory storage coupled to the processor and storing executable code, which, when executed by the processor, causes the processor to:
cause a portion of a radio frequency (RF) signal transmitted by the transmit chain to be provided to the receive chain;
determine a first in-phase direct current (DC) voltage of an in-phase baseband signal provided by the in-phase receive portion of the receive chain, the in-phase baseband signal based on the portion of the RF signal;
determine a first quadrature DC voltage of a quadrature baseband signal provided by the quadrature receive portion of the receive chain, the quadrature baseband signal based on the portion of the RF signal;
introduce a DC voltage offset into a plurality of modulated data packets and provide the plurality of modulated data packets to the in-phase portion of the transmit chain;
provide a plurality of modulated data packets to the quadrature portion of the transmit chain;
after the provision of the plurality of modulated data packets to the transmit chain, determine a second in-phase DC voltage of another in-phase baseband signal provided by the in-phase portion of the receive chain based on the portion of the RF signal;
after the provision of the plurality of modulated data packets to the transmit chain, determine a second quadrature DC voltage of another quadrature baseband signal provided by the quadrature portion of the receive chain based on the portion of the RF signal;
determine an in-phase DC voltage offset compensation based on the first and second in-phase DC voltages, based on the first and second quadrature DC voltages, and based on the DC voltage offset;
determine a quadrature DC voltage offset compensation based on the first and second in-phase DC voltages, based on the first and second quadrature DC voltages, and based on the DC voltage offset; and
cause the in-phase DC voltage offset compensation and the quadrature DC voltage offset compensation to be used to transmit signals.

19. The IC of claim 18, wherein the transmit chain and the receive chain are included in a zero intermediate frequency (ZIF) transceiver of the IC.

20. The IC of claim 18, further comprising an auxiliary receive chain comprising an in-phase auxiliary receive portion and a quadrature auxiliary receive portion, wherein the portion of the RF signal is provided to the in-phase portion of the receive chain by the in-phase portion of the auxiliary receive portion and provided to the quadrature portion of the receive chain by the in-phase portion of the auxiliary receive portion.

* * * * *